No. 725,420. PATENTED APR. 14, 1903.
A. V. DES MOINEAUX.
MINER'S TOOL.
APPLICATION FILED JULY 19, 1902.
NO MODEL.
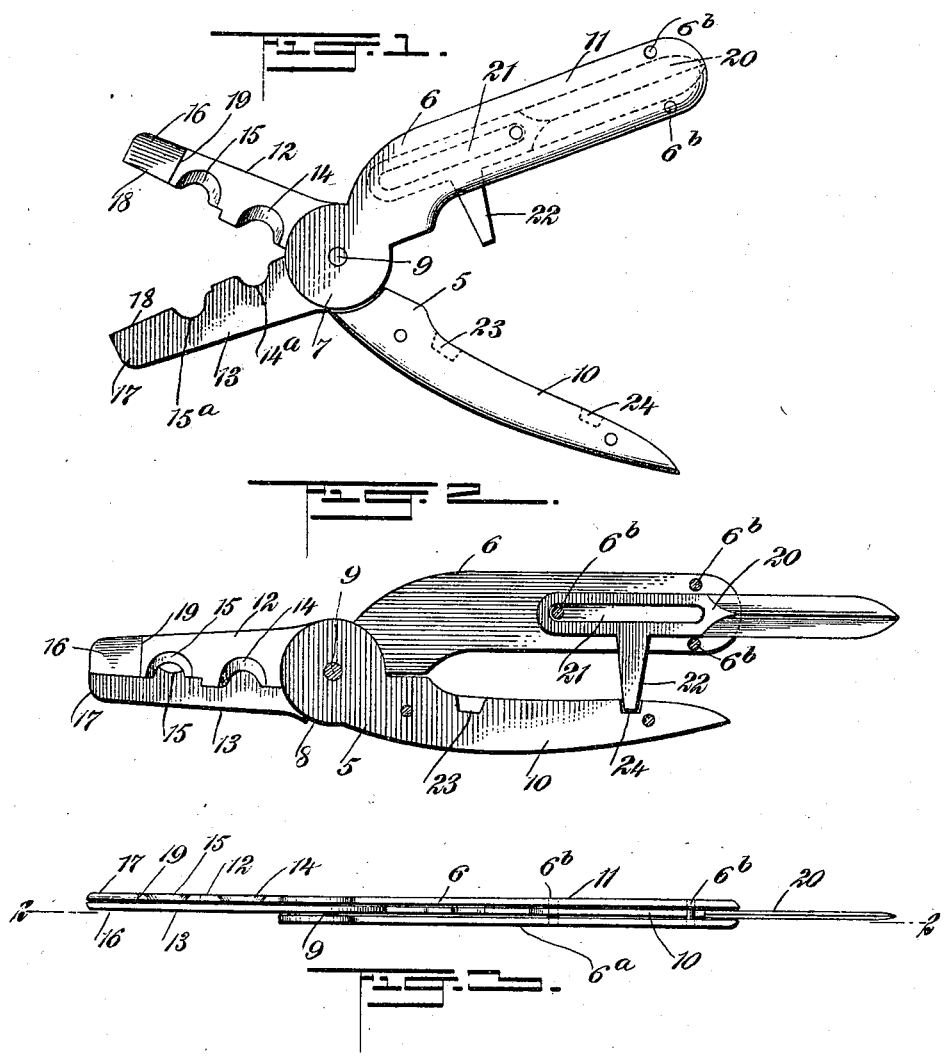

UNITED STATES PATENT OFFICE.

ALFRED VICTOR DES MOINEAUX, OF SILVERPLUME, COLORADO, ASSIGNOR OF THREE-FOURTHS TO HELEN DES MOINEAUX, OF SILVERPLUME, COLORADO.

MINER'S TOOL.

SPECIFICATION forming part of Letters Patent No. 725,420, dated April 14, 1903.

Application filed July 19, 1902. Serial No. 116,269. (No model.)

*To all whom it may concern:*

Be it known that I, ALFRED VICTOR DES MOINEAUX, a citizen of the United States, and a resident of Silverplume, in the county of Clear Creek and State of Colorado, have invented new and useful Improvements in Miners' Tools, of which the following is a full, clear, and exact description.

The present invention in miners' tools is more particularly designed as an improvement on the implement patented to me on February 4, 1902, by United States Letters Patent No. 692,637; and the object that I have in view in the present invention is to increase the usefulness of the patented implement by the provision of a powder-lance which is adapted to be held firmly against slipping in its projected or retracted positions, whereby the improved implement combines in a compact and simple form the devices required for the several operations in preparing a blasting charge.

With these ends in view the invention consists in the novel construction and arrangement of parts comprising my improved miner's tool, as will be hereinafter fully described and claimed.

Reference is to be had to the accompanying drawings, forming a part of this specification, in which similar characters of reference indicate corresponding parts in all the figures.

Figure 1 is a side elevation of a miner's combination-tool embodying my improvements. Fig. 2 is a sectional view thereof, showing the parts of the tool in their closed positions, the plane of the section being indicated by the dotted line 2 2 of Fig. 3; and Fig. 3 is a view in edge elevation of the improved tool.

As in my former patent, to which reference has been made, the implement consists of the members 5 6, which are provided with the disk-like portions 7 8, respectively, which overlap one another and are united pivotally together by the stud or pin 9. The members are provided with the handles 10 11, respectively, and they are formed on the opposite side of the pivot from their handles with the jaws 12 13. The members have their parts arranged, as shown by Figs. 1 and 2, for the jaws 12 13 to close together when the handles 10 11 are pressed toward each other; but by opening the handles these jaws are adapted to move away from each other, thus assuming the position shown in Fig. 1. The jaws 12 13 are provided with the recesses 14 14$^a$, respectively, which are located quite close to the pivot 9, and said recesses are beveled so as to produce cutting edges adapted to substantially shear past each other. (See Fig. 2.) These recesses 14 14$^a$ constitute the crimping means whereby a metallic cap may be compressed or crimped around a fuse. The jaws are furthermore provided with the cutting-recesses 15 15$^a$, the same being located at points intermediate of the length of the jaws and beyond the crimping-recesses 14 14$^a$. The recesses 15 15$^a$ are beveled so as to produce cutting edges which are also adapted to shear past each other, and said recesses form the means by which the fuse may be severed.

As thus far described, the tool is similar to the one disclosed in my prior patent; but in the improved implement I have sought to increase its capability of service by the provision of means which serve to split the end of a fuse and to cut a stick of powder into lengths.

In attaining the first-named object I prolong the ends of the jaws 12 13 beyond the cutting-recesses 15 15$^a$, and these prolonged ends are beveled on their opposing faces so as to produce the coöperating blades 16 17, the cutting edges of which are indicated at 18 and said beveled portions of the blades being defined by the shoulders 19.

The member 6 of the instrument is provided with a plate 6$^a$, which is disposed parallel thereto and is united therewith by means of a series of studs 6$^b$ and the pivot-pin 9. This member 6$^a$ is spaced with relation to the handle portion 11 of the member 6, and a space is provided within the handle portion of said member 6 for the reception of a lance 20. This lance is adapted to be projected beyond the handle 11 and to slide between two of the studs 6$^b$, as shown more clearly by Fig. 2, and the shank of said lance is formed with a longitudinal slot 21, through which passes another of the series of studs 6$^b$, whereby the lance is slidably confined in the handle portion of the member 6. This shank of the lance is also provided with an integral locking stud or projection 22, which extends laterally beyond the inner edge of the handle portion 11 and is adapted to fit into either of the recesses or notches 23 24, the latter being provided in the inner edge of the handle portion 10, forming a part of the member 5. The notches 23 24 are located near the inner or outer portion of the handle 10, and when the implement is closed and the lance is withdrawn into a space in the handle 11 the stud or projection 22 is adapted to enter the notch 23, thus locking the lance in its retracted position within the handle 11. To use the lance, however, the stud 22 may be manipulated by the fingers so as to project the lance beyond the end of the handle in the position shown by Fig. 2, and when the implement is closed the stud or projection 22 is adapted to enter the notch 24, thereby locking the lance in its projected position beyond the handle.

In the service of the implement the jaws may be opened and a cap may be crimped around a fuse by placing it in the recesses 14 14ᵃ and closing the jaws, or the fuse may be cut by closing the recessed portions 15 15ᵃ upon the fuse. If it is desired to split one end of the fuse, the blades 17 18 of the jaws may be closed upon the end of the fuse by pressing the handles 10 and 11 together. A pressed stick of the powder may be easily cut by using the lance 20, the latter being projected beyond the handle 11 and locked in its projected position by the stud 22, fitting in the notch 24, the handles being pressed together, as shown by Fig. 2.

Having thus described my invention, I claim as new and desire to secure by Letters Patent—

1. A miner's tool, comprising pivoted members, one of which is provided with an opening or space and the other one is formed with spaced notches, and a lance having a slotted shank slidably confined in the space of one member and provided with a locking projection arranged to fit into either of the notches of the other member.

2. A miner's tool having one of its handles provided with a longitudinal slot, a lance slidably confined in the slotted handle and movable endwise to a projected position beyond said handle or to a closed position therein, and means for holding the lance in its retracted and projected positions.

In testimony whereof I have signed my name to this specification in the presence of two subscribing witnesses.

ALFRED VICTOR DES MOINEAUX.

Witnesses:
SAMUEL NASH,
FRED. L. MINER.